United States Patent [19]

Dickey et al.

[11] Patent Number: 5,284,202
[45] Date of Patent: Feb. 8, 1994

[54] COMPRESSOR AFTERCOOLER APPARATUS FOR USE IN LOW TEMPERATURE OPERATIONS, AND METHOD OF USE

[75] Inventors: James R. Dickey, Winston Salem; Daniel T. Martin, Clemmons; Michael J. Shannon, Mocksville, all of N.C.

[73] Assignee: Ingersoll-Rand Company, Woodcliff Lake, N.J.

[21] Appl. No.: 75,845

[22] Filed: Jun. 11, 1993

Related U.S. Application Data

[63] Continuation of Ser. No. 873,143, Apr. 24, 1992, abandoned.

[51] Int. Cl.⁵ .................. F28F 27/02; F04B 23/00; F04B 25/00; F04B 49/10
[52] U.S. Cl. .......................... 165/1; 165/39; 165/85; 417/32; 417/46; 417/243; 239/14.2; 239/128
[58] Field of Search .......... 165/39, 1, 85; 123/563; 60/599; 417/243, 32, 46, 47; 236/35; 239/14.2, 128, 2.2

[56] References Cited

U.S. PATENT DOCUMENTS

| 3,018,617 | 1/1962 | Kelgard | 60/599 |
|---|---|---|---|
| 3,354,945 | 11/1967 | Grudeborn | 165/40 |
| 4,036,432 | 7/1977 | George | 165/39 |
| 4,176,630 | 12/1979 | Elmer | 123/563 |
| 4,200,146 | 4/1980 | Olson | 165/39 |
| 4,296,605 | 10/1981 | Price | 60/599 |
| 4,443,156 | 4/1984 | Dunnam, Jr. | 417/32 |
| 4,485,624 | 12/1984 | Melchior | 165/39 |
| 4,570,849 | 2/1986 | Klaucke et al. | 417/46 |
| 4,653,574 | 3/1987 | Quinlisk | 165/54 |
| 4,708,120 | 11/1987 | Mann | 123/563 |
| 4,862,952 | 9/1989 | Tarasewich | 165/54 |
| 4,889,180 | 12/1989 | Sloan | 417/243 |
| 4,971,137 | 11/1990 | Thompson | 165/40 |

FOREIGN PATENT DOCUMENTS

| 3201246 | 7/1983 | Fed. Rep. of Germany | 60/599 |
|---|---|---|---|
| 2609327 | 7/1988 | France | 239/14.2 |
| 0148614 | 11/1981 | Japan | 60/599 |
| 0185990 | 10/1983 | Japan | 417/243 |
| 390731 | 11/1973 | U.S.S.R. | 417/32 |
| 825270 | 12/1959 | United Kingdom | 60/599 |
| 2023797 | 1/1980 | United Kingdom | 60/599 |
| 2138553 | 10/1984 | United Kingdom | 417/243 |

OTHER PUBLICATIONS

Sterlco Bulletin 505A—Self-Modulating Temperature Control Valves, Sterling, Inc. Milwaukee, WI.

*Primary Examiner*—John K. Ford
*Attorney, Agent, or Firm*—Victor M. Genco, Jr.

[57] ABSTRACT

An aftercooler through which a first fluid passes. A cooling fan applies a cooling fluid to the aftercooler. A variable speed motor is rotatably coupled to the cooling fan. A temperature sensor, in communication with the first fluid, is located downstream of the aftercooler. A controller controls operation of the variable speed motor based upon the temperature applied to the temperature sensor to prevent condensate freeze-up.

2 Claims, 1 Drawing Sheet

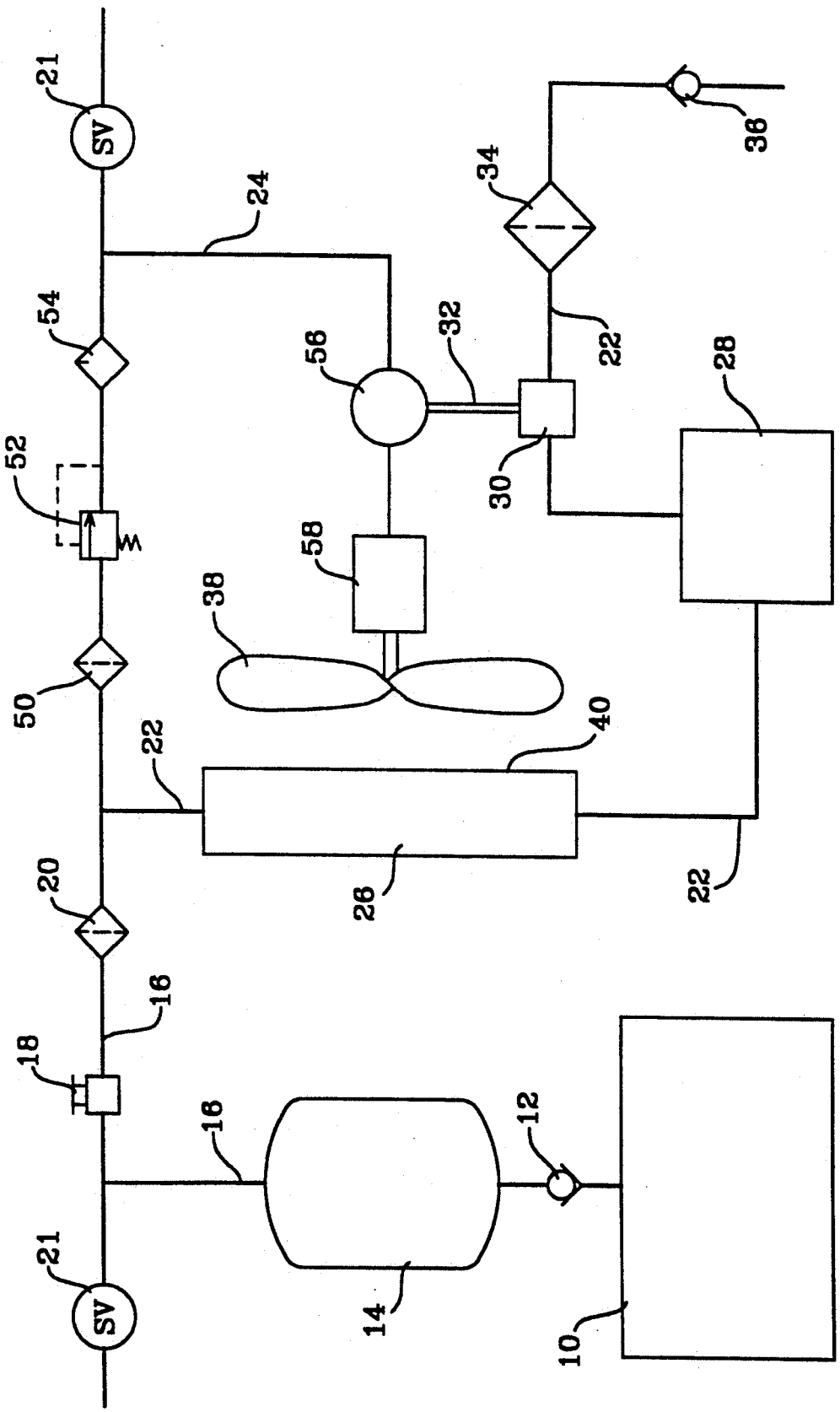

COMPRESSOR AFTERCOOLER APPARATUS FOR USE IN LOW TEMPERATURE OPERATIONS, AND METHOD OF USE

This application is a continuation of application Ser. No. 07/873,143, filed Apr. 24, 1992, now abandoned.

BACKGROUND OF THE INVENTION

This invention relates generally to aftercoolers for fluid compressors, and more particularly to mechanisms which regulate cooling of a cooling core portion of an aftercooler to thereby prevent the aftercooler from overcooling a working fluid when the aftercooler is used during periods of cold ambient temperatures.

As is well known, an aftercooler is a heat exchanger for cooling a compressed working fluid, such as air, which is discharged from a compressor. The aftercooler cools the working fluid to a predetermined temperature to make the working fluid less destructive during its use with an object of interest.

There are several known devices which limit fluid flow through the aftercooler based upon indications from a thermostat. An example of such a device is disclosed in U.S. Pat. No. 3,354,945. In these systems, a portion of the cooling fluid applied from the cooling fan to the cooling core is blocked, reducing the effectiveness. Additionally, and in these systems, the cooling fan continues to operate at the same angular velocity, using the same amount of energy and causing the same amount of cooling fan wear as if the cooling fan was operating at full speed.

The foregoing illustrates limitations known to exist in present cooling systems for aftercoolers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus including an aftercooler adapted to have a working fluid passing therethrough. A cooling fan applies a cooling fluid to the aftercooler. A variable speed motor is rotatably coupled to the cooling fan. A temperature sensor, which is disposed in communication with the first working fluid, is located downstream of the aftercooler. A controller controls operation of the variable speed motor based upon the temperature applied to the temperature sensor.

The foregoing and other aspects will become apparent from the following detailed description of the invention when considered in conjunction with the accompanying drawing figure.

BRIEF DESCRIPTION OF THE DRAWING FIGURES

The FIGURE is a schematic view illustrating an embodiment of a cooling control arrangement of a compressed working fluid aftercooler of the present invention.

DETAILED DESCRIPTION

The FIGURE illustrates a fluid compressor 10 which delivers working fluid such as air, other gasses or liquids under pressure to a reservoir 14. A check valve 12 limits passage from the reservoir 14 back to the compressor 10. In this specification, the term "compressor" is intended to cover all compressors, pumps, or other fluid displacing machines.

A service conduit 16, which contains a manual valve 18 such as an inlet ball valve 18, is in fluid communication with the reservoir 14. The inlet ball valve 18 controls working fluid delivery from the reservoir 14. A strainer 20 removes impurities from the working fluid passing through the service conduit 16. Safety valve 21 is inserted in the service conduit 16 in case the pressure exceeds a predetermined limit (which is often a percentage of the pressure which the service conduit 16 or the associated elements can support).

The service conduit 16 divides into a first conduit 22 and a second conduit 24. The first conduit 22 supplies the working fluid to an aftercooler 26, a water separator 28, a sensor portion 30 of a fluid control system 32, one or more coalescing filters 34 and a discharge check valve 36.

The aftercooler 26 consists of a heat exchanger which reduces the temperature of the working fluid so that the water separator 28 can effectively remove condensate from the working fluid. A cooling fan 38 displaces cooling air across a face 40 of the aftercooler 26. Aftercoolers (which are heat exchangers used in a specific application) are rated by the maximum airflow which may be cooled to a specific temperature above the ambient air temperature. This temperature differential is known in the art as the approach temperature. The temperature of the air exiting from the aftercooler is a function of two variables: ambient air temperature and the temperature of the working fluid in the service line 16 upstream of the aftercooler 26. Providing that the temperature of the working fluid in the service line upstream of the aftercooler remains substantially constant (which it usually an accurate assumption since this working fluid has typically recently passed from a discharge of the compressor), then a change in the ambient air temperature will result in an equal change in temperature being discharged from the aftercooler 26.

When the aftercooler 16 and compressor are being used in a cold environment (for example snow making), the temperature of the working fluid in the service line downstream of the aftercooler may be reduced wherein moisture in the working fluid may actually freeze. This phenomenon is possible at any location downstream of the aftercooler 26, but is especially likely in the water separator 28 and portions of the service line remote from the aftercooler. Eventually, ice blocks fluid passage of the working fluid in the service conduit 16 from the aftercooler 26 to the discharge check valve, including the elements associated therewith as well. This results in considerable wear and possible premature failure to the service conduit as well as the associated elements.

The second conduit 24 of the service line applies working fluid from the service line 16 through a filter 50, a regulator 52, a lubricator 54, and a valve portion 56 of the fluid control system 32 to a variable speed fan motor 58. The fan motor 58 is rotatably coupled to, and directly determines the angular velocity of, the cooling fan 38. Generally, the quicker the operation of the cooling fan 38, the more cooling fluid that is applied to the face 40 of the aftercooler 26 and the greater the cooling effects resulting therefrom to the aftercooler 26. The reverse is generally true as the cooling fan is slowed down.

The fluid control system 32 includes a sensor portion 30 and a valve portion 56. The fluid control system may be an off the shelf type temperature control valve, typically used in storing water heating and heat exchanger applications. An example of a temperature control valve which may be used is a Sterlco ® brand R-150-F temperature control valve (Sterlco is a trademark of Sterlco, Inc. of Milwaukee, Wis.). The sensor portion 30 may be mounted in a portion of the first conduit 22, downstream the aftercooler 26, such as, in the water separator 28 or other location where icing is likely to occur.

If the temperature applied to the sensor portion 30 of the fluid control system 32 drops over a predetermined temperature range, then the valve portion 56 will respond by incrementally closing. The more closed the valve portion 56 becomes, the less fluid will flow to a portion of the second conduit 24 communicating with the fan motor 58. As less fluid flows to the fan motor (which is typically a standard air motor), the angular velocity of the fan motor 58 and the fan 38 will decrease incrementally. The specific predetermined temperature range described above can be set by the operator depending upon the type and size of compressor used, the temperature ranges where the compressor is likely to be used, associated elements to be used with the compressor, and length of the service conduit 22 among other considerations.

The operation of the embodiment illustrated in the FIGURE is as follows. When the temperature is high enough, as indicated by the sensor portion 30, such that freezing is unlikely to occur in the first conduit 22 downstream of the aftercooler, then the valve portion 56 of the fluid control system 32 will remain open and the fan motor 58 will be operating at full speed (for the pressure of the working fluid applied to the second conduit 24). When the ambient temperature drops, resulting in a drop of the temperature of the working fluid in the first conduit downstream of the aftercooler 26 to the predetermined temperature range of the sensor portion 30, then the valve portion 56 will incrementally close resulting in a slowing of the fan motor 58 and the fan 38. The predetermined temperature range may be set to apply to the specific compressor application.

In this manner, as the ambient temperature drops, more of the heat removal of the aftercooler 26 results from the ambient temperature applied to the aftercooler, and less of the heat removal results from the cooling effects produced by the cooling fluid being discharged from the fan 38.

The embodiment pictured in the FIGURE has the advantages over the prior art aftercooler arrangements since the angular velocity of the fan motor decreases with temperature, resulting in decreased wear to, and reduced energy consumption by, the fan motor 58.

While this invention has been illustrated and described in accordance with a preferred embodiment, it is recognized that other variations and changes may be made therein without departing from the invention as set forth in the claims.

Having described the invention, what is claimed is:

1. A method of inhibiting the formation of frozen condensate in a compressed working fluid of a compressor system, the method comprising the steps of:
    passing to an aftercooler a portion of a total volume of a compressed working fluid which is provided by a compressor;
    displacing a cooling fluid across the aftercooler with a fan;
    driving the fan with a variable speed, compressed working fluid powered, motor means which is provided with the portion of the total volume of the compressed working fluid which has not been provided to the aftercooler;
    measuring the temperature of the compressed working fluid flowing downstream of the aftercooler; and
    inhibiting the formation of frozen condensate within a compressed working fluid, which has a temperature of about 32° F., through continuous regulation of the flow rate of the compressed working fluid driving the compressed working fluid powered motor means to incrementally vary the speed of the compressed working fluid powered motor means in direct response to the measured temperature of the compressed working fluid.

2. A compressor aftercooler apparatus for use in low ambient temperature operations, the apparatus comprising:
    an aftercooler adapted to receive a portion of a compressed working fluid provided by a compressor;
    a fan for displacing a cooling fluid across the aftercooler;
    a variable speed, fluid powered motor means rotatably coupled to the fan in motive force supplying relation therewith, for driving the fan at a predetermined speed, the fluid powered motor means being powered by the compressed working fluid which is provided by the compressor and which has not been received by the aftercooler, the predetermined speed of the fluid powered motor means being a direct function of the flow rate of the compressed working fluid flowing therethrough;
    a temperature sensor for measuring the temperature of the compressed working fluid flowing downstream of the aftercooler; and
    means for inhibiting the formation of frozen condensate with a compressed working fluid having a temperature of about 32° F., the frozen condensate inhibiting means including a variable orifice valve which continuously regulates the flow rate of the compressed working fluid powering the fluid powered motor means to incrementally vary the speed of the fluid powered motor means in direct response to the temperature measured by the temperature sensor.

* * * * *